United States Patent [19]
Dean et al.

[11] Patent Number: 5,155,811
[45] Date of Patent: Oct. 13, 1992

[54] READ/WRITE HEAD BUFFER

[75] Inventors: Robert E. Dean, Boulder; Steven C. Cacka, Longmont, both of Colo.; John F. Kitchen, Lindfield, Australia; Douglas P. Schaefer, Lafayette, Colo.; Hossein F. Sevvom, Boulder, Colo.; Robert A. Brumnet, Denver, Colo.

[73] Assignee: Storage Technology Corporation, Louisville, Colo.

[21] Appl. No.: 304,662

[22] Filed: Jan. 31, 1989

[51] Int. Cl.⁵ .................................... G06F 13/362
[52] U.S. Cl. ............................ 395/250; 360/64; 360/72.2
[58] Field of Search ........................... 364/200, 900

[56] References Cited
U.S. PATENT DOCUMENTS

| | | | |
|---|---|---|---|
| 3,831,191 | 8/1974 | Gold | 360/22 |
| 4,688,106 | 8/1987 | Keller et al. | 360/64 |
| 4,882,671 | 11/1989 | Graham et al. | 364/200 |
| 4,918,651 | 4/1990 | Bonke et al. | 364/900 |
| 4,974,199 | 11/1990 | Verbanets, Jr. et al. | 364/900 |

*Primary Examiner*—Gareth D. Shaw
*Assistant Examiner*—John Q. Chavis
*Attorney, Agent, or Firm*—Dorr, Carson, Sloan & Peterson

[57] ABSTRACT

The read/write head buffer provides a buffer memory for each read/write head in the rotating media data storage system to that a seek request from the processor can be handled as soon as the beginning of the requested data record is positioned below the associated read/write head. The data image stored on the rotating media is read from the rotating media by the read/write head and stored in the read/write head buffer independent of the availability of a data communication path to the processor. Thus, the read data operation need not be synchronized with the availability of a data communication path to the processor and the requested data is retrieved from the rotating media as soon as the data record is properly positioned. In no case is the data retrieval time greater than one revolution of the rotating media. The error correction codes written on the rotating media to protect the integrity of the requested data are maintained since they are stored in the read/write head buffer along with the data record. Thus, once a data communication path is established to the processor, the control module receives the track data image from the read/write head buffer and can deformat this data from the bit serial, run length limited coding with error correction characters format of this data and convert this information to eight bit parallel data that is in an input/output record format for use by the control unit.

16 Claims, 1 Drawing Sheet

READ/WRITE HEAD BUFFER

CROSS REFERENCE TO RELATED APPLICATIONS

This application is related to application Ser. No. 304,788 now abandoned entitled Track Image Read/Write Head Buffer and application Ser. No. 304,664 now abandoned entitled Address Mark Triggered Read/Write Head Buffer, both filed on the same date as this application.

FIELD OF THE INVENTION

This invention relates to data storage systems and, in particular, to a data buffer that is used in a rotating media data storage system to improve the data transfer performance of the data storage system.

BACKGROUND OF THE INVENTION

It is a problem in the field of data storage systems to minimize the data retrieval time when reading a data record from a data storage system. In disk drive memory systems for example, a processor is typically connected by a channel interface unit to a plurality of data channels. Each data channel is connected to one or more Direct Access Storage Device (DASD) units which function to store large quantities of data. Each DASD unit includes a control unit for interfacing with the data channel that typically carries eight bit parallel data in a byte serial decoded input/output record format. The control unit performs a data management function to maintain records of the location of all the data stored in the DASD unit. The DASD unit includes rotating data storage media consisting of a plurality of disks, each of which has associated therewith one or more moveable read/write heads. The data is stored on the rotating media in a track format that consists of a plurality of concentric rings of data. A control module is also included at the head of a string of disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which serves to read and write data on an associated disk of the rotating media.

In a data record read operation, the processor transmits a seek request, through the channel interface unit and an available data channel, to the DASD control unit associated with the rotating media on which the requested data record is stored. The processor, upon completion of the transmission of the seek request, returns to processing other tasks. The DASD control unit responds to the seek request by determining the physical location of the requested data record on the plurality of disks. The control unit transmits information to the associated control module identifying the physical location and size of the data record in order to retrieve the requested data record from one of the disks of the rotating media. Since the data record is stored in a track format on a rotating media, the actuator associated with the identified disk of the rotating media on which the requested data record is stored must wait until the rotating media rotates a sufficient distance to present the beginning of the requested data record underneath the read/write head associated with the actuator.

A predetermined time before the beginning of the requested data record reaches the read/write head associated with the actuator, the control module requests the control unit to obtain a data communication path to the processor in order to transmit the retrieved data record from the rotating media directly to the processor over this data communication path. If a data communication path to the processor is not available, the control module must wait for one entire revolution of the rotating media before the media is again in the position where the requested data record is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system, where there are a multitude of random data seeks, such delays can unnecessarily tie up actuators in the disk drive unit and significantly increase the system response time.

SUMMARY OF THE INVENTION

The above described problems are solved and a technical advance achieved in the field by the read/write head buffer that improves data transfer performance in a rotating media data storage system by rendering the data read operation at the read/write head independent of the control module, control unit and the availability of the data communication path from the control unit to the processor. This is accomplished by providing a buffer memory for each read/write head in the rotating media data storage system so that a seek request from the processor can be handled as soon as the beginning of the requested data record is positioned below the read/write head of the associated actuator. The data record is read from the rotating media by the read/write head and stored in the read/write head buffer independent of the availability of a data communication path to the processor. Thus, the read data record operation need not be synchronized with the availability of a data communication path to the processor.

The data record read by the read/write head is stored in the read/write head buffer in two, seven run length limited (RLL) self clocking code format with the error correction code bits appended to the data record. The read/write head buffer does not process the image read from the rotating media but instead stores this image for subsequent deformatting and processing by the control module. The read/write head buffer includes a phase locked loop to maintain signal clocking independent of the control module. By providing the read/write head buffer on a one per actuator basis, the response time of the rotating media data storage system for a memory access is significantly reduced since the requested data record is retrieved from the rotating media as soon as the data record is properly positioned and in no case will this time be greater than one revolution of the rotating media.

The error correction codes written on the rotating media to protect the integrity of the requested data record are maintained since they are stored in the read/write head buffer along with the data record. Thus, once a data communication path is established to the processor, the control module receives the image that was stored on the rotating media from the read/write head buffer and can deformat this data from the bit serial, run length limited self clocking coding with error correction characters format of this data and convert this information to eight bit parallel data that is in an input/output record format for use by the control unit. The control unit stores the decoded error checked data record and transmits the requested data record to the processor over the available data channel if a full track buffer is present in the cache. If the cache is not equipped with a full track buffer, only the count and key records are buffered. In this fashion, the read/write head buffer enables the processor to effectively "start" and "stop" the rotating media to obtain data stored thereon. While the rotation of the rotating media is not interrupted, the use of the read/write head buffer enables the processor to have access to a data record independent of the operation of the rotating media.

DETAILED DESCRIPTION

Figure 1:
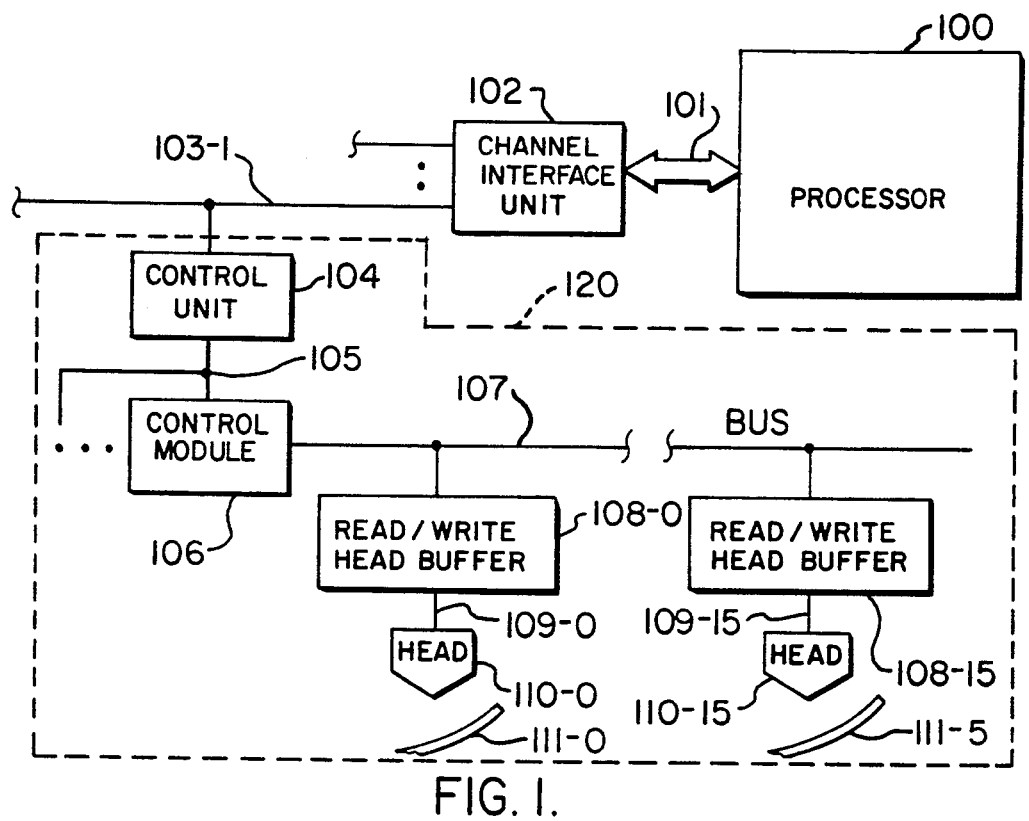
FIG. 1 illustrates the overall architecture of the read/write head buffer as placed in a data processing environment.

In computer systems, a processor is typically connected by a channel interface unit to a plurality of data channels. Each data channel is connected to one or more Direct Access Storage Device (DASD) units which function to store large quantities of data. These DASD units typically use rotating data storage media comprised of either optical disks or magnetic disks to store data records thereon.

A typical DASD unit is the IBM 3380-type disk drive unit that uses magnetically readable/writable disks as the data storage media. Each of these 3380-type DASD units includes a control unit for interfacing with a data channel to the processor that typically carries eight bit parallel data in a byte serial decoded input/output record format. The control unit performs a data management function to maintain records of the physical location of all the data stored on the DASD unit. The DASD unit includes rotating data storage media typically consisting of a plurality of magnetically readable/writable disks, each of which has associated therewith one or more moveable read/write heads. The data is stored on the rotating media in a track format that consists of a plurality of concentric rings of data. A control module is also included at the head of a string disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which serves to read and write data on an associated disk of the rotating media.

Data Record Read Operation

In a data record read operation, the processor transmits a seek request, through the channel interface unit and an available data channel, to the DASD control unit associated with the rotating media on which the requested data record is stored. The processor, upon completion of the transmission of the seek request, returns to processing other tasks. The DASD control unit responds to the seek request by determining the physical location of the requested data record on the plurality of disks. The control unit transmits information to the associated control module identifying the physical location and size of the data record in order to retrieve the requested data record from one of the disks of the rotating media. Since the data record is stored in a track format on a rotating media, the actuator associated with the identified disk of the rotating media on which the requested data record is stored must wait until the rotating media rotates a sufficient distance to present the beginning of the requested data record underneath the read/write head associated with the actuator.

A predetermined time before the beginning of the requested data record reaches the read/write head associated with the actuator, the control module requests the control unit to obtain a data communication path to the processor in order to transmit the retrieved data record from the rotating media directly to the processor over this data communication path. If a data communication path to the processor is not available, the control module must wait for one entire revolution of the rotating media before the media is again in the position where the requested data record is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system where there are a multitude of random data seeks, such delays can unnecessarily tie up actuators in the disk drive unit and significantly increase the system response time.

The read/write head buffer improves data transfer performance in a rotating media data storage system by rendering the data read operation at the read/write head independent of the control module, control unit and the availability of the data communication path from the control unit to the processor. This is accomplished by providing a buffer memory for each read/write head in the rotating media data storage system so that a seek request from the processor can be handled as soon as the beginning of the requested data record is positioned below the read/write head of the associated actuator. The data record is read from the rotating media by the read/write head and stored in the read/write head buffer independent of the availability of a data communication path to the processor. Thus, the read data record operation need not be synchronized with the availability of a data communication path to the processor.

The data record read by the read/write head is stored in the read/write head buffer in run length limited self clocking code format (such as 2, 7 coding) with the error correction code bits appended to the data record. The read/write head buffer does not process the image read from the rotating media but instead temporarily stores this image for subsequent deformatting and processing by the control module. The read/write head buffer includes a phase locked loop to maintain signal clocking independent of the control module. By providing the read/write head buffer on a one per actuator basis, the response time of the rotating media data storage system for a memory access is significantly reduced since the requested data record is retrieved from the rotating media as soon as the data record is properly positioned and in no case will this time be greater than one revolution of the rotating media.

The error correction codes written on the rotating media to protect the integrity of the requested data record are maintained since they are stored in the read/write head buffer along with the data record. Thus, once a data communication path is established to the processor, the control module receives the image that was stored on the rotating media from the read/write head buffer and can deformat this data from the bit serial, run length limited self clocking (two, seven RLL) coding with error correction characters format of this data and convert this information to eight bit parallel data that is in an input/output record format for use by the control unit. The control unit stores the decoded error checked data record and transmits the requested data record to the processor over the available data channel. In this fashion, the read/write head buffer enables the processor to effectively "start" and "stop" the rotating media to obtain data stored thereon. While the rotation of the rotating media is not interrupted, the use of the read/write head buffer enables the processor to have access to a data record independent of the operation of the rotating media.

System Architecture

FIG. 1 illustrates the overall architecture of a data processing system that is equipped with an associated data storage system that includes a plurality of memory devices, one of which is illustrated in FIG. 1 in the form of a conventional 3380-type of disk drive unit 120. Processor 100 is connected via bus 101 to a channel interface unit 102 that serves to interconnect processor 100 with a plurality of data channels 103-1 to 103-n, each of which is an eight bit parallel data bus. Connected to one of these data channels 103-1 is the disk drive unit 120 mentioned above.

Disk drive unit 120 includes a control unit 104 that functions to provide overall management of the disk drive unit 120. This management function includes storing information that identifies the exact physical location of all data stored on the rotating media 111-0 to 111-15 of disk drive unit 120. Processor 100 identifies a data record by volume identification and address. While this information provides a general physical location of the data, the exact storage location on the rotating media 111-0 to 111-15 requires additional specificity. Control unit 104 provides this additional specific information by converting the volume and address information received from the processor into head, actuator, track and sector identification information to precisely define the physical location of the requested data record on disk drive unit 120.

The control unit 104 transfers data between data channel 103-1 and one or more control modules (ex. 106) in an eight bit parallel data format wherein each eight bits of data comprise one of a series of bits of the data record in a decoded input/output record format. The data in this format is converted by control module 106 into a bit serial format wherein error correction code characters are appended thereto for error detection and control purposes. The resultant data is then encoded into two, seven code. The control module 106 responds to the control signals transmitted by control unit 104 identifying the head, actuator, track and sector for storing a data record by selecting one of the actuators 110-0 to 110-15 that are used by disk drive unit 120 to read/write data on the rotating media 111-0 to 111-15. While sixteen actuators are illustrated herein, it is expected that future devices may be equipped with 32 or more actuators. The actuators include the read/write head and signal control circuitry for reading and writing the data on the rotating media 111-0 to 111-15.

The above-described conventional disk drive unit 120 of FIG. 1 is also equipped with a plurality of read/write head buffers 108-0 to 108-15 on a one per read/write head basis. The read/write head buffer 108-0, for example, is interposed between bus 107 and read/write head 110-0. The exact physical implementation of this read/write head buffer can also be a single memory connected to bus 107 and partitioned into segments, one segment for each read/write head 108 in disk drive unit 120. Read/write head buffer 108-0 serves to temporarily store the track image captured by the read/write head 110-0.

Read/Write Head Buffer Circuit

Figure 2:
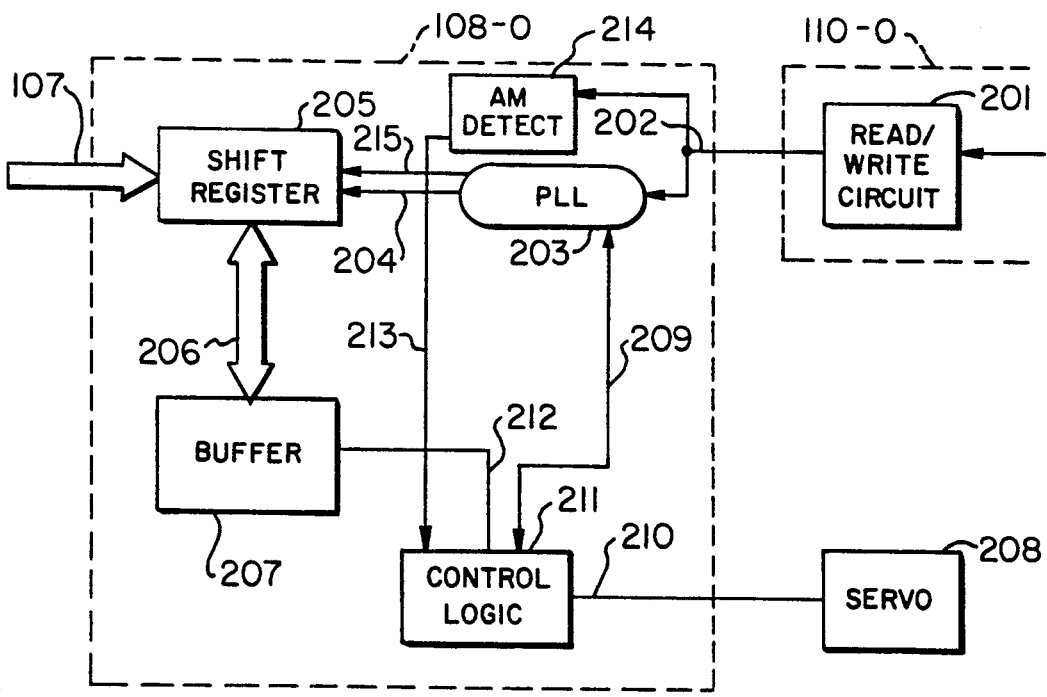
FIG. 2 illustrates additional circuit details of the read/write head buffer.

FIG. 2 illustrates additional detail of read/write head buffer 108-0. Data is read in analog form by read/write circuit 201 of read/write head 110-0 and converted into a digital signal that is typically self clocked. The digital data signal is transmitted by read/write circuit 201 on lead 202 to read/write head buffer 108-0 where it is applied to phase locked loop 203 and address mark detect circuit 214. The address mark detect circuit 214 monitors the digital data signal to identify the presence of an address mark that precedes the count field in each data record stored on the media 111-0. Once address mark detect circuit 214 verifies the presence of the address mark, phase locked loop 203 is activated to separate the data from the clock in the digital data signal and applies the data via lead 215 and the clock via lead 204 to shift register 205. The clock and data signals on leads 204 and 215 enable shift register 205 to receive the serial bits of data and store these data bits in its memory. Each 16 bit byte of 2, 7 encoded data that is stored in shift register 205 is transmitted over bus 206 in parallel form to buffer 207. The addressing of buffer 207 is accomplished by the use of the disk drive servo 208 which identifies the sector count of the rotating media in well-known fashion and outputs this information on lead 210 to control logic 211. The sector count is converted by control logic 211 to a pointer value that is output on lead 212 to address buffer 207. The clock signal from phase locked loop 203 is used to maintain clock timing synchronization to load data into buffer 207. Thus, the digital data signal that is read from the rotating media is maintained in the proper clocking synchronization by the use of phase locked loop 203 so that the data stored via shift register 205 in buffer 207 accurately represents the data stored on the track of the rotating media 111-0.

The accuracy of this data stored in buffer 207 is insured because this data along with its associated error correction code bits is stored in a two, seven code format. The entire track image is thereby temporarily stored in buffer 207 for transmission to control module 106 via shift register 205 and bus 107. Read/write head buffer 108-0 therefore appears transparent to control module 106 in that the output of read/write head buffer 108-0 is identical to the signal output by read/write head 110-0 except for its lack of synchronization with the rotating media 111-0. Control module 106 resynchronizes the data obtained from read/write head buffer 108-0, therefore any data storage errors occasioned by read/write head buffer 108-0 due to defects in the rotating media 111-0 or address marks are easily corrected by control module 106 by use of its own internal phase locked loop and error correction circuitry. Maintenance of the error correction codes through read/write head buffer 108-0 minimizes the possibility of an error occurring in the data transfer process.

Direct Transfer Mode

In a certain percentage of read data record operations, the data record need not be buffered since a data communication path from the control unit 104 to processor 100 is available when the data record is read from the rotating media 111-0 to 111-15. In this case, the retrieved data record is read on a bitwise basis from the rotating media 111-0 by read/write circuit 201 and stored on a bytewise basis in shift register 205. The retrieved data record is then transmitted in parallel via bus 107 to control module 106. Buffer 207 is therefore switchably connectable to bus 107 since it is used only when the data communication path from the control unit 104 to processor 100 is unavailable at the time of reading the data record from the rotating media 111-0.

While a specific embodiment of the present invention has been disclosed, it is expected that those skilled in the art can and will devise alternate embodiments that fall within the scope of the appended claims.

I claim:

1. In a data processing system that includes a processor connected by at least one data channel to at least one control module, each control module being connected by a bus to a plurality of rotating media data storage devices, each of said data storage devices having at least one actuator for positioning a plurality of read/write heads, each said data storage device having at least four said read/write heads per actuator for retrieving data stored on said rotating media, each of said data storage devices comprising:
   a plurality of buffers, for storing data read from said rotating media, each of said buffers being separately connected to a different one of said read/write heads, wherein each of said buffers is interconnected with a said control module via said bus;
   means responsive to said processor requesting data stored in a designated location on said rotating media that is accessible by said read/write heads for transferring said requested data from said rotating media into one of said buffers; and
   means responsive to an available data communication path from said control module to said processor via one of said data channels for transmitting said requested data stored in one of said buffers to said processor via said bus, said control module and said available data communication path.

2. The apparatus of claim 1 wherein said transferring means includes:
   means for reading said requested data from said rotating media data storage device into one of said buffers in the formatted record form as stored on said rotating media data storage device;
   phase locked loop means connected to said reading means for resynching said formatted record form of said requested data.

3. The apparatus of claim 2 wherein said transferring means further includes:
   shift register means for storing said resynched requested data received on a bitwise basis in bytewise form.

4. The apparatus of claim 3 wherein said transferring means further includes:
   means for relocating said requested data from said shift register means to one of said buffers in bytewise form.

5. The apparatus of claim 4 wherein said relocating means includes:
   means responsive to a read record signal from said control unit for converting said read record signal to a memory address identifying the location in one of said buffers where said requested data is stored.

6. The apparatus of claim 5 wherein said relocating means further includes:
   means for applying said memory address to one of said buffers to read said requested data therefrom to said control unit.

7. In a data processing system that includes a processor connected by at least one data channel to at least one control module, each said control module being connected by a bus to a plurality of rotating media data storage devices for retrieving data stored on said rotating media, wherein each of said data storage devices has at least one actuator for positioning a plurality of read/write heads, each of said data storage devices comprising:
   at least four said read/write heads per actuator for accessing data from said rotating media;
   a plurality of buffers switchably connected to said bus for interconnecting said bus and each of said read/write heads for storing data read from said rotating media via one of said read/write heads, wherein each one of said read/write heads is separately connected to a different one of said buffers;
   means responsive to said processor requesting data stored in a designated location on said rotating media that is accessible by said read/write heads for activating one of said read/write heads to read said requested data from said designated location on said rotating media;
   means responsive to the unavailability of said bus for writing said requested data read from said designated location on said rotating media to one of said buffers in the formatted record form as stored on said rotating media data storage device; and
   means responsive to the subsequent availability of said bus for transmitting said requested data stored in one of said buffers to said control module via said bus.

8. The apparatus of claim 7 further including:
   means responsive to the availability of said bus for transmitting said requested data read by one of said read/write heads to said control module via said bus in response to one of said read/write heads reading said requested data from said rotating media into one of said buffers.

9. The apparatus of claim 7 wherein said writing means includes:
   phase locked loop means connected to said reading means for resynching said formatted record form of said requested data.

10. The apparatus of claim 9 wherein said writing means further includes:
   shift register means for storing said resynched requested data received on a bitwise basis in bytewise form.

11. The apparatus of claim 10 wherein said writing means further includes:

means for transferring said requested data from said shift register means to one of said buffers in byte-wise form.

12. The apparatus of claim 7 wherein said transmitting means includes:
means responsive to a read record signal from said control module for converting said read record signal to a memory address identifying the location in one of said buffers where said requested data is stored.

13. The apparatus of claim 12 wherein said transmitting means further includes:
means for applying said memory address to one of said buffers to read said requested data therefrom to said control module.

14. In a data processing system that includes a processor connected by at least one data channel to at least one control module, each control module being connected by a bus to a plurality of rotating media data storage devices for retrieving data stored on said rotating media, wherein each of said data storage devices has at least one actuator for positioning a plurality of read/write heads, each of said data storage devices comprising:
at least four said read/write heads per actuator for accessing data from said rotating media;
a plurality of buffers connected to said bus for interconnecting said bus and each of said read/write heads for storing data read from said rotating media read via one of said read/write heads, wherein each one of said read/write heads is separately connected to a different one of said buffers;
means responsive to said processor requesting data stored in a designated location on said rotating media that is accessible by one of said read/write heads for activating said one of said read/write heads to read said requested data from said designated location on said rotating media;
means responsive to said activating means for writing said requested data read from said designated location on said rotating media to one of said plurality of buffers;
means responsive to the availability of said bus for transmitting said requested data to said control module via said bus;
means responsive to the unavailability of said bus for disabling said transmitting means; and
means responsive to said disabling means and the subsequent availability of said bus for outputting said requested data stored in one of said buffers to said control module via said bus.

15. In a data processing system that includes a processor connected by at least one data channel to at least one control module connected by a bus to a plurality of rotating media data storage devices, wherein each of said data storage devices has at least one actuator for positioning a plurality of read/write heads, each of said data storage devices having at least four said read/write heads per actuator for retrieving data stored on said rotating media, and a plurality of read/write head buffers connected to said read/write heads, wherein said plurality of read/write head buffers are connected to said read/write heads in a manner such that each one of said read/write heads is separately connected to a different one of said read/write head buffers and each of said read/write heads is interconnected with a said control module via said bus, a method of retrieving data from one of said data storage devices comprising the steps of:
writing, in response to said processor requesting data stored in a designated location on said rotating media that is accessible by a given one of said read/write heads, said requested data into one of said read/write head buffers; and
transmitting, in response to the availability of said bus, said requested data stored in said one of said read/write buffers to said control module via said bus.

16. In a data processing system that includes a processor connected by at least one data channel to at least one control module connected by a bus to a plurality of rotating media data storage devices, wherein each of said data storage devices has at least one actuator for positioning a plurality of read/write heads, each of said data storage devices having at least four said read/write heads per actuator for retrieving data stored on said rotating media, each of said data storage devices having a plurality of read/write head buffers interconnecting said read/write heads and said bus for storing data read by said read/write heads, wherein said plurality of read/write head buffers are connected to said read/write heads in a manner such that each one of said read/write heads is separately connected to a different one of said read/write head buffers, a method of improving the performance of said data storage devices comprising the steps of:
reading, in response to said processor requesting data stored in a designated location on said rotating media that is accessible by one of said read/write heads for activating said one of said read/write heads, said requested data from said designated location on said rotating media;
switchably connecting one of said read/write head buffers to one of said read/write heads in response to the unavailability of said bus;
writing, in response to the unavailability of said bus, said requested data read from said designated location on said rotating media to one of said read/write head buffers; and
transmitting, in response to the subsequent availability of said bus, said requested data stored in said one of said read/write head buffers to said bus.

* * * * *